US011264009B2

(12) United States Patent
Hori et al.

(10) Patent No.: US 11,264,009 B2
(45) Date of Patent: *Mar. 1, 2022

(54) SYSTEM AND METHOD FOR A DIALOGUE RESPONSE GENERATION SYSTEM

(71) Applicant: Mitsubishi Electric Research Laboratories, Inc., Cambridge, MA (US)

(72) Inventors: Chiori Hori, Lexington, MA (US); Anoop Cherian, Belmont, MA (US); Tim Marks, Newton, MA (US); Takaaki Hori, Lexington, MA (US)

(73) Assignee: Mitsubishi Electric Research Laboratories, Inc., Cambridge, MA (US)

( * ) Notice: Subject to any disclaimer, the term of this patent is extended or adjusted under 35 U.S.C. 154(b) by 192 days.

This patent is subject to a terminal disclaimer.

(21) Appl. No.: 16/569,679

(22) Filed: Sep. 13, 2019

(65) Prior Publication Data

US 2021/0082398 A1 Mar. 18, 2021

(51) Int. Cl.
*G10L 15/06* (2013.01)
*G10L 15/02* (2006.01)
*G10L 15/22* (2006.01)
*G10L 19/00* (2013.01)

(52) U.S. Cl.
CPC ............ *G10L 15/063* (2013.01); *G10L 15/02* (2013.01); *G10L 15/22* (2013.01); *G10L 19/00* (2013.01)

(58) Field of Classification Search
CPC ....... G10L 15/063; G10L 15/02; G10L 15/22; G10L 19/00
See application file for complete search history.

(56) References Cited

U.S. PATENT DOCUMENTS 10,762,425 B2 *  9/2020  Liu ........................... G06T 7/90
10,861,483 B2 * 12/2020  Feinauer .............. G06K 9/6267
2019/0171929 A1 *  6/2019  Abadi .................... G06N 3/084
(Continued)

*Primary Examiner* — Michael Colucci
(74) *Attorney, Agent, or Firm* — Gennadiy Vinokur; Hironori Tsukamoto

(57) ABSTRACT

A computer-implemented method for training a dialogue response generation system and the dialogue response generation system are provided. The method includes arranging a first multimodal encoder-decoder for the dialogue response generation or video description having a first input and a first output, wherein the first multimodal encoder-decoder has been pretrained by training audio-video datasets with training video description sentences, arranging a second multimodal encoder-decoder for dialog response generation having a second input and a second output, providing first audio-visual datasets with first corresponding video description sentences to the first input of the first multimodal encoder-decoder, wherein the first encoder-decoder generates first output values based on the first audio-visual datasets with the first corresponding description sentences, providing the first audio-visual datasets excluding the first corresponding video description sentences to the second multimodal encoder-decoder. In this case, the second multimodal encoder-decoder generates second output values based on the first audio-visual datasets without the first corresponding video description sentences.

20 Claims, 6 Drawing Sheets

(56) References Cited

U.S. PATENT DOCUMENTS

| | | | | |
|---|---|---|---|---|
| 2019/0236394 A1* | 8/2019 | Price | ...................... | G06N 3/084 |
| 2019/0325595 A1* | 10/2019 | Stein | ...................... | G08G 1/165 |
| 2019/0341025 A1* | 11/2019 | Omote | .................... | G10L 25/30 |
| 2020/0226675 A1* | 7/2020 | Mitra | ..................... | G06Q 30/08 |
| 2021/0005316 A1* | 1/2021 | Neumann | ............... | G06F 40/35 |

* cited by examiner

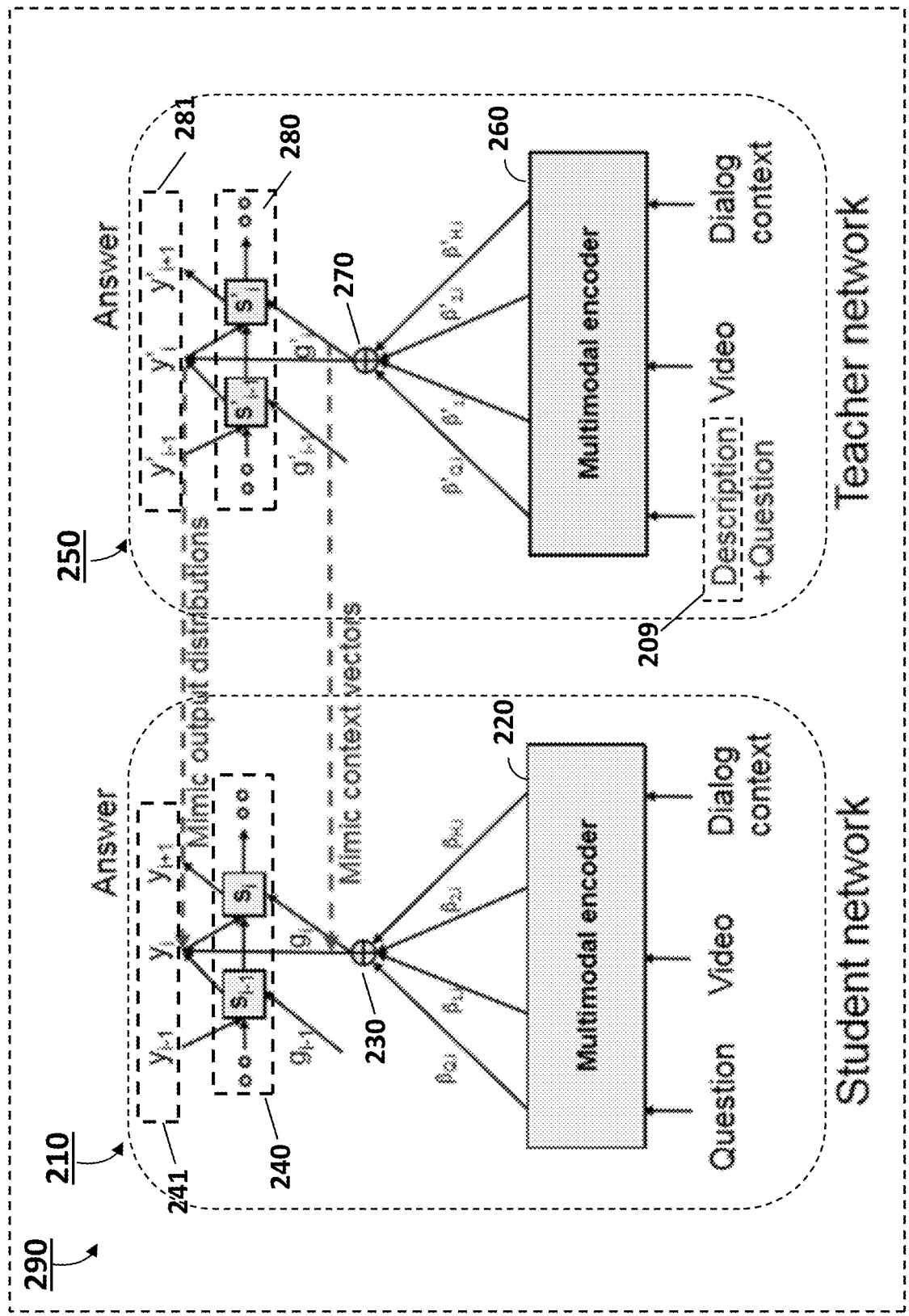
FIG. 2B Student-teacher learning of AVSD system

*Video Scene-aware Dialog Dataset on Charades*

|  | training | validation | trial | test |
|---|---|---|---|---|
| #dialogs | 7,659 | 1,787 | 733 | 1,710 |
| #turns | 153,180 | 35,740 | 14,660 | 13,490 |
| #words | 1,450,754 | 339,006 | 138,790 | 110,252 |

FIG. 4

Evaluation results on the AVSD trial set with single references

| System | Description train | Description test | BLEU1 | BLEU2 | BLEU3 | BLEU4 | METEOR | ROUGE-L | CIDEr |
|---|---|---|---|---|---|---|---|---|---|
| AVSD baseline [5] | — | — | 0.273 | 0.173 | 0.118 | 0.084 | 0.117 | 0.291 | 0.766 |
| AVSD best system [8] | man. | man. | 0.306 | 0.209 | 0.150 | 0.112 | 0.144 | 0.338 | 1.161 |
| + How2 data | man. | man. | 0.311 | 0.212 | 0.152 | 0.114 | 0.146 | 0.337 | 1.169 |
| Our system | man. | man. | 0.311 | 0.214 | 0.156 | 0.117 | 0.150 | 0.345 | 1.234 |
| Our system | man. | — | 0.272 | 0.186 | 0.135 | 0.102 | 0.132 | 0.325 | 1.105 |
| Our system | man. | auto | 0.285 | 0.193 | 0.140 | 0.106 | 0.135 | 0.329 | 1.121 |
| Our system | — | — | 0.283 | 0.192 | 0.139 | 0.105 | 0.135 | 0.327 | 1.119 |
| Student-teacher $\mathcal{L}_{ST}$ | man. | — | 0.313 | 0.212 | 0.152 | 0.113 | 0.143 | 0.334 | 1.138 |
| Student-teacher $\mathcal{L}_{ST}^t$ | man. | — | 0.314 | 0.212 | 0.152 | 0.113 | 0.143 | 0.334 | 1.139 |
| Student-teacher $\mathcal{L}_{SST}$ | man. | — | 0.314 | 0.213 | 0.153 | 0.115 | 0.144 | 0.335 | 1.148 |

FIG. 5A

Evaluation results on the AVSD official test set with six references

| System | Description train | Description test | BLEU1 | BLEU2 | BLEU3 | BLEU4 | METEOR | ROUGE-L | CIDEr |
|---|---|---|---|---|---|---|---|---|---|
| AVSD baseline [5] | — | — | 0.621 | 0.480 | 0.379 | 0.305 | 0.217 | 0.481 | 0.733 |
| AVSD best system [8] | man. | man. | 0.718 | 0.584 | 0.478 | 0.394 | 0.267 | 0.563 | 1.094 |
| + How2 data | man. | man. | 0.723 | 0.586 | 0.476 | 0.387 | 0.266 | 0.564 | 1.087 |
| Our system | man. | man. | 0.727 | 0.593 | 0.488 | 0.405 | 0.273 | 0.566 | 1.118 |
| Our system | — | — | 0.675 | 0.543 | 0.446 | 0.371 | 0.248 | 0.527 | 0.966 |
| Student-teacher $\mathcal{L}_{ST}$ | man. | — | 0.686 | 0.556 | 0.457 | 0.380 | 0.254 | 0.535 | 0.995 |
| Student-teacher $\mathcal{L}_{SST}$ | man. | — | 0.686 | 0.557 | 0.458 | 0.382 | 0.254 | 0.537 | 1.005 |

FIG. 5B

SYSTEM AND METHOD FOR A DIALOGUE RESPONSE GENERATION SYSTEM

FIELD OF THE INVENTION

The invention relates generally to a system and a method for training a dialogue response generation system, and more particularly to a training system and a training method for a dialogue response generation system and a dialogue response generation system trained by thereof.

BACKGROUND OF THE INVENTION

Human-machine interfaces that can process spoken dialogs have revolutionized the way we interact with smart phone digital assistants, car navigation systems, voice-controlled smart speakers, and human-facing robots. Going forward, such systems will need capabilities to accommodate other input modalities, including vision, to generate adequate responses in varied user contexts or process novel situations that were not available during training. However, the current state-of-the-art dialogue systems lack efficient models for processing multimodal sensory inputs (e.g., vision, audio, and text) that are required to handle such dynamic scenes, and thus may not be able to generate suitable responses in conversations.

To interact with humans about environmental information surrounding users, systems need to understand both contexts of environments and natural language inputs by users. Such scene-aware dialogue methods are essential for man-machine interface of real-world applications. To respond human actions, machines need to understand scenes using multimodal information consisting of any kinds of physical signals (features) such as audios and videos. The semantic representation of multimodal information to describe scenes in natural language is most effective way to help generating system responses. Accordingly, there is a need to develop methods for enhancing the quality of dialogue response generation through multimodal scene understanding.

Recently, a new dialogue task using multimodal information processing has been proposed, called Audio-Visual Scene-aware Dialog (AVSD). AVSD focuses on response sentence generation for dialogue systems aimed at answering a user's questions about a provided video, in which the system can use audio-visual information in the video as well as the dialogue history up to the user's last question. Optionally, manual video description sentences that explain the video clip are also available as input to the system. Recent approaches to the AVSD task proposed in the 7th Dialog System Technology Challenge (DSTC7) have shown that multimodal fusion of audio, visual, and text information is effective to enhance the response quality. Further, it is found that the best performance is achieved when applying text features extracted from the "manual" video description sentences. However, such manual video description sentences are unavailable in the real world, posing challenges during deployment.

To improve the performance of the response generation without using the manual video description sentences at an inference phase, a new approach is required to transfer the performance gain obtained by applying manual video description sentences at training time to generate more accurate responses.

SUMMARY OF THE INVENTION

According to some embodiments of the present invention, a computer-implemented method for training a dialogue response generation system and the dialogue response generation system can be provided. The method may include arranging a first multimodal encoder-decoder for the dialogue response generation or video description having a first input and a first output, wherein the first multimodal encoder-decoder has been pretrained by training audio-video datasets with training video description sentences, arranging a second multimodal encoder-decoder for dialog response generation having a second input and a second output, providing first audio-visual datasets with first corresponding video description sentences to the first input of the first multimodal encoder-decoder, wherein the first encoder-decoder generates first output values based on the first audio-visual datasets with the first corresponding description sentences, providing the first audio-visual datasets excluding the first corresponding video description sentences to the second multimodal encoder-decoder. In this case, the second multimodal encoder-decoder generates second output values based on the first audio-visual datasets without the first corresponding video description sentences.

In some cases, the automatic video description sentences output from the first multimodal encoder-decoder may be input into the second multimodal encoder-decoder for dialog response generation. Further, the video description features which is a context vector extracted from the first multimodal encoder-decoder for automatic video description can be embedded into the second multimodal encoder-decoder for dialogue response generation to consider the sematic representation of multimodal information to describe scenes using natural language.

Yet further, in some cases, the second multimodal encoder-decoder (student network) can be trained when the first multimodal encoder-decoder for dialogue response generation (teacher network) is trained using the manual video description sentences in order to transfer the performance gain obtained by the teacher network for dialogue response generation to the student network.

Furthermore, the context vectors output from the first multimodal encoder-decoder for video description described above may be embedded in the second multimodal encoder-decoder for dialogue response generation, wherein the automatic video description sentences obtained from the first multimodal encoder-decoder may be used instead of the manual description sentences. In this case, the embodiments described above may be combined to generate more accurate dialog responses based on audio-visual scene understanding using the output and intermediate representation of the output of the automatic video description network.

BRIEF DESCRIPTION OF THE DRAWINGS

The presently disclosed embodiments will be further explained with reference to the attached drawings. The drawings shown are not necessarily to scale, with emphasis instead generally being placed upon illustrating the principles of the presently disclosed embodiments.

FIG. 2B is a block diagram illustrating a student-teacher learning system for the AVSD system according to some embodiments of the present invention;

FIG. 4 shows the statistics of video scene-aware dialogue dataset, according to some embodiments of the present invention;

FIG. 5A shows evaluation results on the AVSD trial inference set with single references, according to embodiments of the present invention; and FIG. 5B shows evaluation results on the AVSD official inference set with six references for each response, according to embodiments of the present invention.

While the above-identified drawings set forth presently disclosed embodiments, other embodiments are also contemplated, as noted in the discussion. This disclosure presents illustrative embodiments by way of representation and not limitation. Numerous other modifications and embodiments can be devised by those skilled in the art which fall within the scope and spirit of the principles of the presently disclosed embodiments.

Detailed Description of the Preferred Embodiments

The following description provides exemplary embodiments only, and is not intended to limit the scope, applicability, or configuration of the disclosure. Rather, the following description of the exemplary embodiments will provide those skilled in the art with an enabling description for implementing one or more exemplary embodiments. Contemplated are various changes that may be made in the function and arrangement of elements without departing from the spirit and scope of the subject matter disclosed as set forth in the appended claims.

Figure 1:
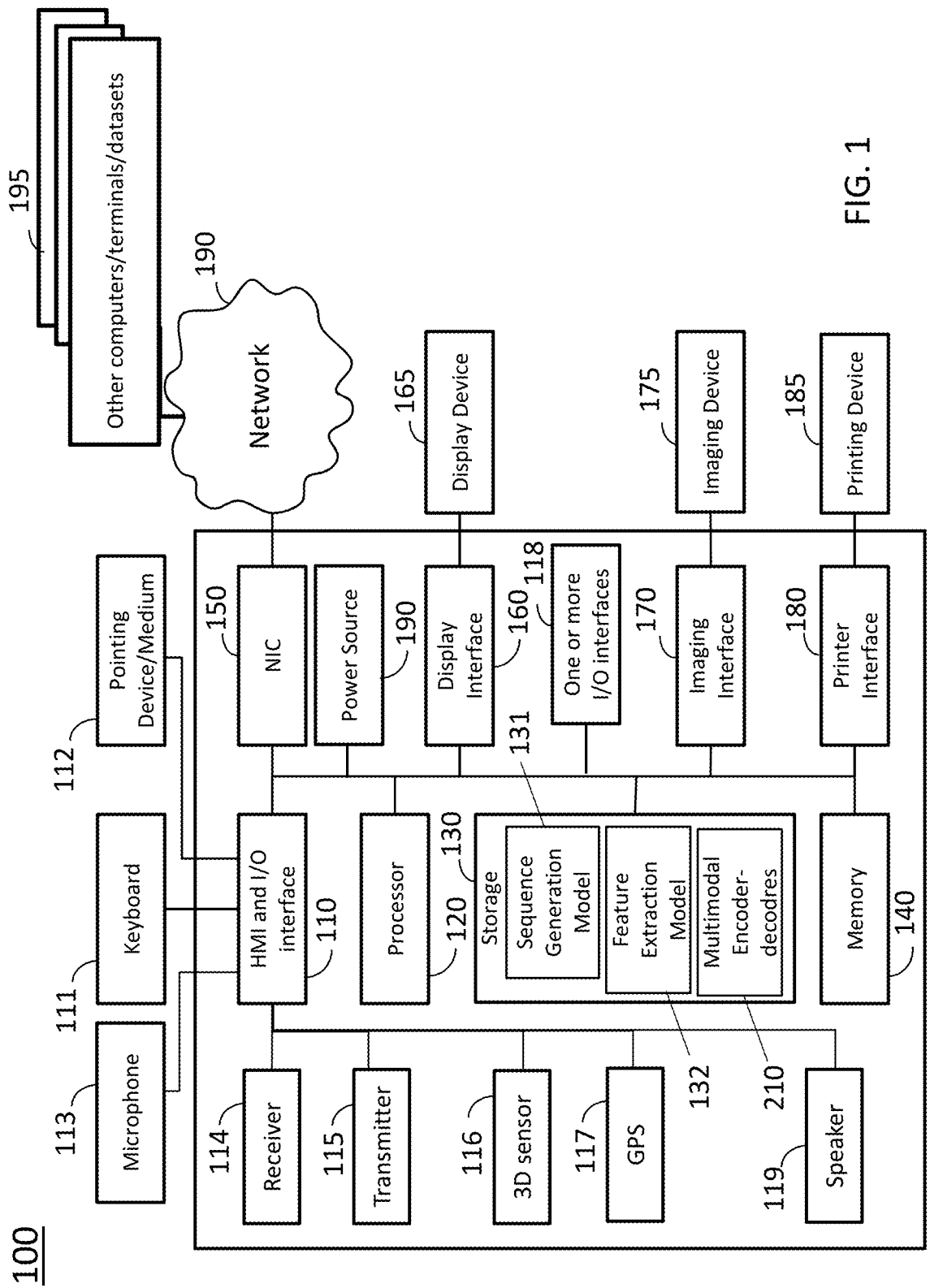
FIG. 1 is a block diagram illustrating a multimodal fusion system according to some embodiments of the present disclosure.

FIG. 1 is a block diagram illustrating a multimodal fusion system according to some embodiments of the present invention.

The present disclosure is based on a multimodal "fusion" system 200 that generates the context vectors 220 from the input data that include multiple modalities 211. In some cases, the multimodal fusion system 200 receives input features including text features 201, image (video) features 202, audio features 203, and motion features extracted from the vide features 202 and generates a dialog system response 231 relevant to the input features 211 as shown FIG. 2A. The text input 201 can include manual video description 209 or automatic video description 391, user inputs such as questions 208 and dialog histories 207.

Figure 3:
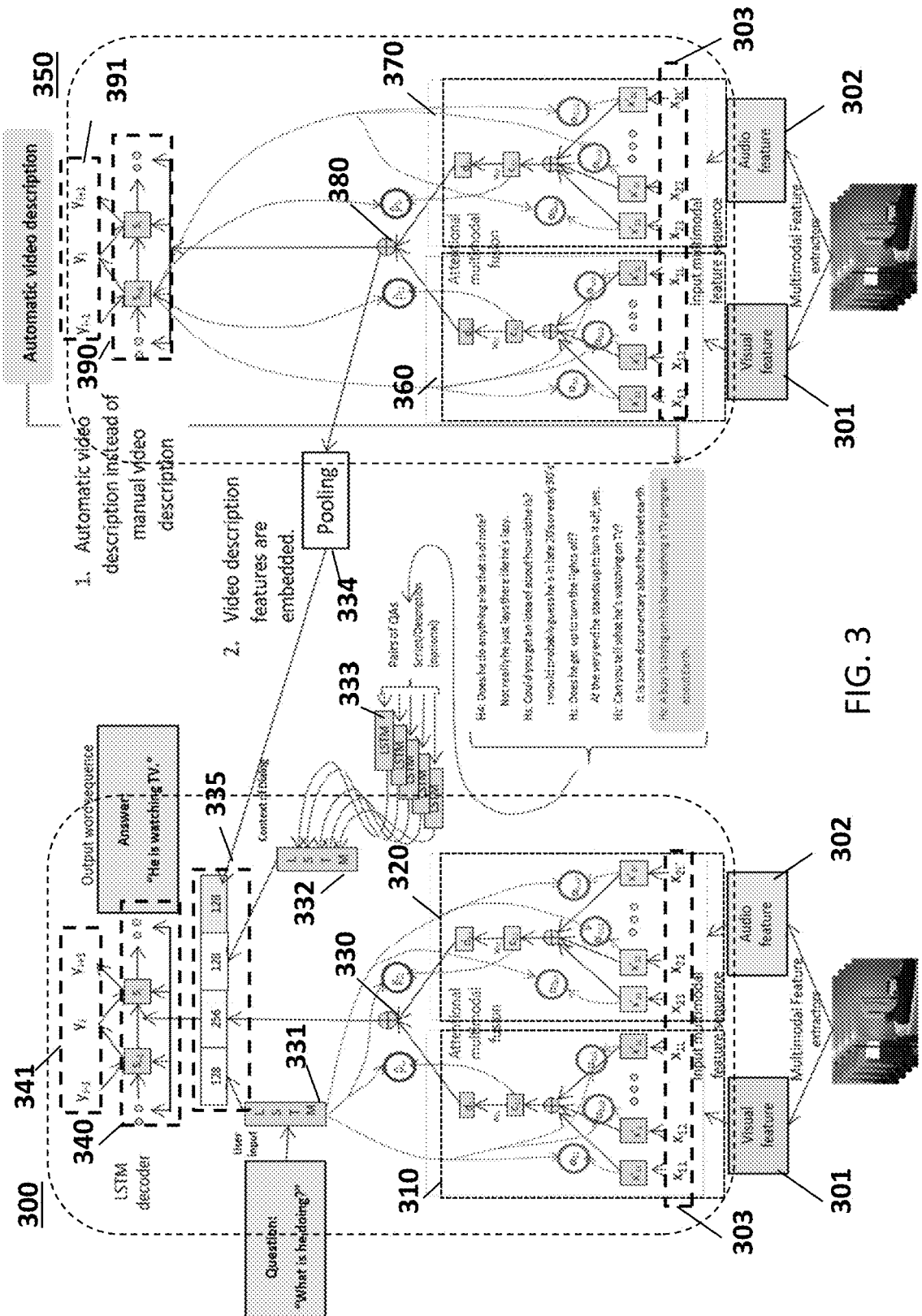
FIG. 3 is a diagram illustrating that how the AVSD system is trained using an automatic video description encoder-decoder according to an embodiment of the present invention.

FIG. 3 is a diagram illustrating that how the AVSD system is trained using an automatic video description encoder-decoder according to an embodiment of the present invention. The figure shows the first multimodal encoder-decoder for video description 350 and the second multimodal encoder-decoder for dialog response generation 300. In this case, the inputs are multimodal features 303 and the outputs are natural language 341, 391.

Some embodiments of a present disclosure are based on generating context vectors for automatic video descriptions 380, audio-visual fusion 330 and context vectors of the dialogue system responses 335, wherein the audio-visual context vector 330 from input data including "multiple modalities" 303 is combined with the context vectors of the question 331, the dialog history 332 and the embedded context vector of the automatic video description 380 as show in FIG. 3. In some cases, the modalities may be text features 331 and 332, 333, video features (image features) 301, audio features 302 and motion features extracted from the video features 301.

Figure 2A:
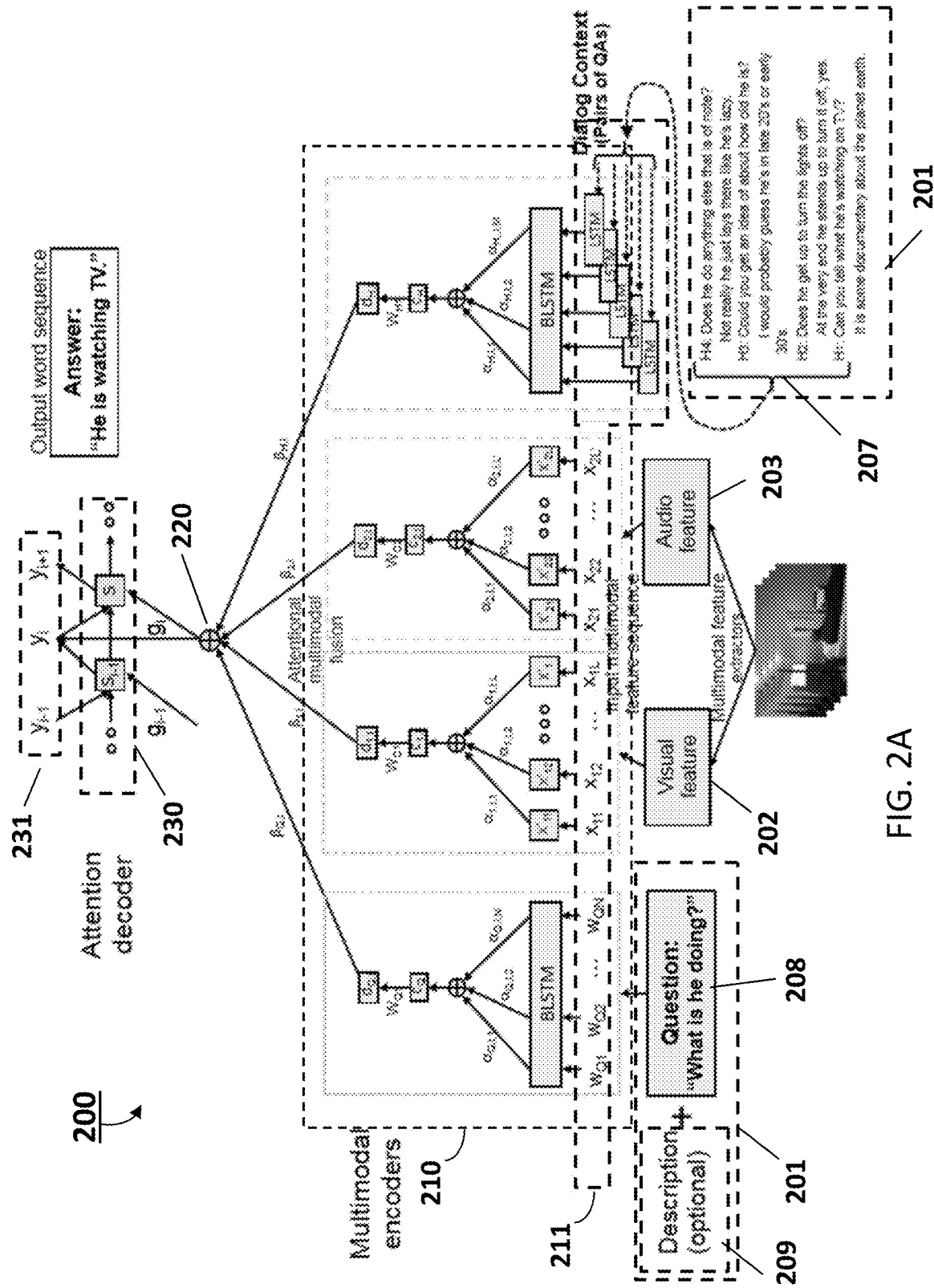
FIG. 2A is a block diagram illustrating an AVSD system using multimodal fusion method according to embodiments of the present disclosure.

The present disclosure is based on a multimodal "fusion" system 210 that generates the context vectors 220 from the input data that include multiple modalities 211 as shown in FIG. 2A. In some cases, the multimodal fusion system 210 receives input features including text features 201, image (video) features 202, audio features 203, and motion features extracted from the video features 202 and generates a dialog system response 231 relevant to the input features 211.

Some embodiments of the present disclosure are based on generating context vectors 333 obtained from the first multimodal encoder-decoder for automatic video descriptions 350, wherein the automatic video description sentences 391 are input to the second multimodal encoder-decoder for dialog response generation 300 as text features 333 input instead of the manual video description sentences 201 relevant to the auto-video datasets.

In addition, the context vector output 380 from the encoder of the first multimodal encoder-decoder for video description 350 may be embedded in the context vector of the dialog response sentences 335 input to the decoder of the second multimodal encoder-decoder for dialog response generation 300.

Further, some embodiments of the present invention can provide a system or method that can solve how to compensate the performance gain obtained by applying manual video description sentences during the inference phase, which is missing in the inference phase but available in training phase, to improve the quality of system responses without using manual video description sentences.

In order to transfer the performance gain obtained by applying the manual video description sentences at training time to the inference phase, an AVSD system can be trained through a student-teacher learning approach 290 as shown FIG. 2B. The teacher model 250 for dialog response generation based on the first multimodal encoder-decoder is first trained with the manual video description sentences, then a student model 210 based on the second multimodal encoder-decoder for dialog response generation is trained without the manual video descriptions to mimic the teacher's output 281. The student model 210 is used in the inference phase. This framework can be extended to joint student-teacher learning, where the both models are trained simultaneously not only to reduce their own loss functions but also to have similar hidden representations of context vectors with each other 230 and 270. In this learning, the teacher model 250 is updated to be mimicked more easily by the student model 210 since the context vector of the teacher model 270 approaches to that of the student model 230. The new system using student-teacher learning 290 achieves better performance without using the manual video description sentences. Furthermore, it is competitive to those trained with manual video description sentences.

Further, other embodiments may be based on a pair of first and second multimodal encoder-decoder, 210 and 250 respectively, for dialogue response generation as shown in FIG. 2B, wherein one is named a teacher network 250 trained by inputting the manual video description sentences 209, while another one named as a student network 210 is not trained using the manual video description sentences. The second multimodal encoder-decoder 210 trained without the manual video description sentences 209 is applied to infer the dialogue response generation.

Training Methods

According to some embodiments of the present disclosure, a computer-implemented method for training a dialogue response generation system includes steps of arranging a first multimodal encoder-decoder for video description 350 or dialogue response generation 250 having a first input and a first output, wherein the first multimodal encoder-decoder has been pretrained by training audio-video datasets using video description sentences 209, arranging a second multimodal encoder-decoder for dialog response generation 300, 210 having a second input and a second output, providing first audio-visual datasets with first corresponding video description sentences 209, to the first input of the first multimodal encoder-decoder 350, 250, wherein the first encoder-decoder generates first output values based on the first audio-visual datasets with the first corresponding video description sentences 209, providing the first audio-visual datasets excluding the first corresponding video description sentences 209 to the second multimodal encoder-decoder for dialog response generation 210, wherein the second multimodal encoder-decoder generates second output values based on the first audio-visual datasets, without the first corresponding video description sentences 209, wherein an optimizer module updates second network parameters of the second multimodal encoder-decoder until errors between the first output values and the second output values are reduced into a predetermined range, wherein the errors are computed based on a loss function.

Training Systems

Further, another embodiment of the present invention can provide a system (training system) for training a dialogue response generation system. The training system has the same architecture of the inference system as shown in FIG. 1. The training system includes a memory 140 and one or more storage devices 130 storing instructions of a computer-implemented method; one or more processors 120 in connection with the memory 140 and one or more storage devices that are operable 130, when executed by the one or more processors 120, to cause the one or more processors 120 to perform operations comprising steps of: arranging a first multimodal encoder-decoder for video description or dialogue response generation 210 having a first input and a first output through 110, wherein the first multimodal encoder-decoder 210 has been pretrained by training audio-video datasets 195 with training video description sentences 195; arranging a second multimodal encoder-decoder for dialog response generation 210 having a second input and a second output through 110; providing first audio-visual datasets 195 with first corresponding description sentences 195 to the first input of the first multimodal encoder-decoder 210, wherein the first multimodal encoder-decoder 210 generates first output values based on the first audio-visual datasets 195 with the first corresponding description sentences 195; providing the first audio-visual datasets 195 excluding the first corresponding description sentences 195 to the second multimodal encoder-decoder 210, wherein the second multimodal encoder-decoder 210 generates second output values based on the first audio-visual datasets 195 without the first corresponding description sentences 195, wherein an optimizer module updates second network parameters of the second multimodal encoder-decoder 210 until errors between the first output values and the second output values are reduced into a predetermined range, wherein the errors are computed based on a loss function.

Inference System

Yet further, according to some embodiments of the present invention, a dialogue response generation system 100 can be provided as shown in FIG. 1. In this case, the dialogue response generation system includes a memory 140 and one or more storage devices 130 storing instructions of multimodal encoder-decoders 210, wherein the multimodal encoder-decoders 210 have been trained by a computer-implemented method stored in 130 (not shown in FIG. 1); one or more processors 120 in connection with the memory 140 and one or more storage devices 130 that are operable, when executed by the one or more processors 120, to cause the one or more processors 120 to perform operations comprising steps of receiving first and second input vectors according to first and second sequential intervals; extracting first and second feature vectors using first and second feature extractors stored in 130, respectively, from the first and second input; estimating a first set of weights and a second set of weights, respectively, from the first and second feature vectors and a prestep context vector of a sequence generator; calculating a first context vector from the first set of weights and the first feature vectors, and calculating a second context vector from the second set of weights and the second feature vectors; transforming the first context vector into a first modal context vector having a predetermined dimension and transforming the second context vector into a second modal context vector having the predetermined dimension; estimating a set of modal attention weights from the pre-step context vector and the first and second context vectors or the first and second modal context vectors; generating a weighted context vector having the predetermined dimension from the set of modal attention weights and the first and second modal context vectors; and generating a predicted word using the sequence generator for generating the word sequence from the weighted context vector.

Specific details are given in the following description to provide a thorough understanding of the embodiments. However, understood by one of ordinary skill in the art can be that the embodiments may be practiced without these specific details. For example, systems, processes, and other elements in the subject matter disclosed may be shown as components in block diagram form in order not to obscure the embodiments in unnecessary detail. In other instances, well-known processes, structures, and techniques may be shown without unnecessary detail in order to avoid obscuring the embodiments. Further, like reference numbers and designations in the various drawings indicated like elements.

Also, individual embodiments may be described as a process, which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be re-arranged. A process may be terminated when its operations are completed, but may have additional steps not discussed or included in a figure. Furthermore, not all operations in any particularly described process may occur in all embodiments. A process may correspond to a method, a function, a procedure, a subroutine, a subprogram, etc. When a process corresponds to a function, the function's termination can correspond to a return of the function to the calling function or the main function.

Furthermore, embodiments of the subject matter disclosed may be implemented, at least in part, either manually or automatically. Manual or automatic implementations may be executed, or at least assisted, through the use of machines, hardware, software, firmware, middleware, microcode, hardware description languages, or any combination thereof. When implemented in software, firmware, middleware or microcode, the program code or code segments to perform the necessary tasks may be stored in a machine-readable medium. A processor(s) may perform the necessary tasks.

FIG. 1 shows a block diagram of a dialogue response generation system 100 according to some embodiments of the present invention. The system 100 can include a human machine interface (HMI) with input/output (I/O) interface 110 connectable with a keyboard 111 and a pointing device/medium 112, a microphone 113, a receiver 114, a transmitter 115, a 3D sensor 116, a global positioning system (GPS) 117, one or more I/O interfaces 118, a processor 120, a storage device 130, a memory 140, a network interface controller 150 (NIC) connectable with a network 190 including local area networks and internet network (not shown), a display interface 160 connected to a display device 165, an imaging interface 170 connectable with an imaging device 175 including a camera that may obtain pictures and moving images (video features) with/without acoustic features, a printer interface 180 connectable with a printing device 185. The HMI with I/O interface 110 may include analog/digital and digital/analog converters. The HMI with I/O interface 110 includes a wireless communication interface that can communicate with other 3D point cloud display systems or other computers via wireless internet connections or wireless local area networks, which enable to construct multiple 3D point clouds. The system 100 can include a power source 190. The power source 190 may be a battery rechargeable from an external power source (not shown) via the I/O interface 118. Depending upon the application the power source 190 may be optionally located outside of the system 100.

The HMI and I/O interface 110 and the I/O interface 118 can be adapted to connect to another display device (not shown) including a computer monitor, camera, television, projector, or mobile device, among others. the interfaces 110 and 118 are configured to receive video features and sound features, and the features can be provided via the network 190.

The system 100 can receive electric text/imaging documents 195 including speech data via the network 190 connected to the NIC 150. The storage device 130 includes a sequence generation model 131, a feature extraction model 132 and a multimodal encoder-decoders 200, in which algorithms of the sequence generation model 131, the feature extraction model 132 and the multimodal encoder-decoders 200 are stored into the storage 130 as program code data. The algorithms of the models 131-132 and 200 may be stored to a computer readable recording medium (not shown) so that the processor 120 can execute the algorithms of the models 131-132 and multimodal encoder-decoders 200 by loading the algorithms from the medium. Further, the pointing device/medium 112 may include modules that read and perform programs stored on a computer readable recording medium.

In order to start performing the algorithms of the models 131-132 and multimodal encoder-decoders 200, instructions may be transmitted to the system 100 using the keyboard 111, the pointing device/medium 112 or via the wireless network or the network 190 connected to other computers (not shown). The algorithms of the models 131-132 and 200 may be started in response to receiving acoustic features or video features via the display interface 160 or the network 190 using pre-installed conventional speech recognition program (not shown) stored in the storage 130. Further, the system 100 includes a turn-on/off switch (not shown) to allow the user to start/stop operating the system 100.

The HMI and I/O interface 110 may include an analogy-digital (A/D) converter, a digital-analogy (D/A) converter and wireless signal antenna for connecting the network 190. Further the one or more than one I/O interface 118 may be connectable to a cable television (TV) network, optical fiber networks or a conventional television (TV) antenna receiving TV signals and multimodal information signals. The signals received via the interface 118 can be converted into digital images and audio signals, which can be processed according to the algorithms of the models 131-132 and 200 in connection with the processor 120 and the memory 140 so that video scripts are generated and displayed on the display device 165 with picture frames of the digital images while the sound of the acoustic of the TV signals are output via a speaker 19. The speaker may be included in the system 100, or an external speaker may be connected via the interface 110 or the I/O interface 118.

The processor 120 may be a plurality of processors including one or more than graphics processing units (GPUs). The storage 130 may include speech recognition algorithms (not shown) that can recognize speech signals obtained via the microphone 113.

The multimodal encoder-decoders system module 200, the sequence generation model 131 and the feature extraction model 132 may be formed by neural networks.

Some embodiments of the present invention are based on recognition that student-teacher learning can be a technique of transfer learning, in which the knowledge in a teacher model is transferred to a student model. This is can be used for model compression, where a small model is trained to mimic the output of a large model that has higher prediction accuracy. Student-teacher learning can bring the performance of the small model closer to that of the large model, while preserving the small model's benefits of reduced computational cost and memory consumption.

Student-teacher learning can also be used to compensate for missing information in the input. In this case, the teacher model is trained to predict target labels using additional information, but the student model is trained to mimic the teacher's output without that information. In automatic speech recognition (ASR), for example, a teacher model is trained with enhanced speech obtained through a microphone array, while a student model is trained to mimic the teacher's output for the same speech but only using single-channel-recorded noisy speech. With this method, the student model can improve the performance without the microphone array at inference time. This technique was also used for domain adaption between child and adult speech. The proposed AVSD system takes this approach to compensate for a missing video description. The student model can generate better responses without description features. We further extend this framework to joint student-teacher learning, aiming at improving the teacher model to be a better teacher for the student model.

FIG. 2A is a block diagram illustrating an architecture of a computer-implemented multimodal-attention model (method) 200 based audio-visual scene-aware dialogue system (architecture) according to embodiments of the present disclosure.

The system generates the context vectors 220 from the input data that include multiple modalities 211. In some cases, the multimodal fusion system 200 receives input features including text features 201, image (video) features 202, audio features 203, and motion features extracted from the vide features 202 and generates a dialog system response 231 relevant to the input features 211. The text input 201 can include manual video description 209 or automatic video description 391, user inputs such as questions 208 and dialog histories 207.

The figure shows an example of an architecture of the proposed AVSD system according to embodiments of the present invention. The model (method) 200 employs an attention-based encoder-decoder 210 and 230, which enable the network to emphasize features from specific time frames depending on the current context, enabling the next word to be generated more accurately. The efficacy of attention models has been shown in many tasks such as machine translation and video description.

The attention-based encoder-decoder is designed as a sequence-to-sequence mapping process using recurrent neural networks (RNNs). Let X and Y be input and output sequences, respectively. The model computes the posterior probability distribution P(Y|X). For the AVSD task, X includes all the input information such as the user's question 208, audio-visual features 202 and 203, and dialogue context (dialogue history) 207. Y is the system response to be generated 231, which answers the user's question 208. The most likely hypothesis of Y is obtained as:

$$\hat{Y} = \underset{Y \in V^*}{\mathrm{argmax}} P(Y \mid X) \quad (1)$$

$$= \underset{Y \in V^*}{\mathrm{argmax}} \prod_{i=1}^{|Y|} P(y_i \mid y_1, \ldots, y_{i-1}, X), \quad (2)$$

where $V^*$ denotes a set of sequences of zero or more words in system vocabulary V, and each $y_i$ is a word in the response.

Let $X = \{X_1, \ldots, X_K\}$ be a set of input sequences, where $X_k$ is the kth input sequence, which can represent the user's question 208, a feature vector sequence extracted from the target video clip 202 and 203, or dialogue history 207 that includes all of the previous questions and answers in the dialogue about the video clip. To generate system response Y, each input sequence in X is first encoded to a better representation using a corresponding encoder.

If $X_k$ is a user's question 208, the sentence $Q = w_{Q,1}, \ldots, w_{Q,N}$ is encoded with word embedding and BLSTM layers. If $X_k$ is a video feature sequence $X_k = x_{k2}, x_{k2}, \ldots, x_{kL_k}$, it can be extracted from the image sequence of the video clip using a pretrained CNN, such as VGG-16, C3D, or I3D, that was originally trained for an image or video classification task. In the case of C3D and I3D, multiple images are fed to the network at once to capture dynamic features in the video. The audio features can also be extracted in a similar way using a pretrained CNN such as SoundNet or VGGish. Each feature vector sequence is encoded to an appropriate representation $X'_k = x'_{k1}, x'_{k2}, \ldots, x'_{kL_k}$ using a single projection layer for dimensionality reduction. If $X_k$ is the dialogue history, it can be a sequence of question-answer pairs $H = H_1, \ldots, H_J$ that appear before the current question in the dialog. H is encoded using a hierarchical LSTM encoder, where each question-answer pair is first encoded to a fixed dimensional vector $H_J$ using a sentence-embedding LSTM, and the sequence of sentence embedding is further embedded using additional BLSTM layers.

The decoder 230 predicts the next word iteratively beginning with the start-of-sentence token, <sos>, until it predicts the end-of-sentence token, <eos>. Given decoder state $s_{i-1}$, the decoder network $\lambda_D$ infers the next-word probability distribution as $$P(y \mid y_1, \ldots, y_{i-1}, X) \approx P(y \mid s_{i-1}, g_i) = \quad (3)$$
$$\mathrm{softmax}(W_s^{(\lambda_D)}[s_{i-1}, g_i] + b_s^{(\lambda_D)}),$$

and generates the word $y_i$ that has the highest probability according to $$y_i = \underset{y \in V}{\mathrm{argmax}} P(y \mid s_{i-1}, g_i). \quad (4)$$

The decoder state is updated using the LSTM network of the decoder as $$s_i = \mathrm{LSTM}(s_{i-1}, [y'_i, g_i]; \lambda_D), \quad (5)$$

where $y'_i$ is a word-embedding vector of $y_i$, and $g_i$ is a context vector 220 including the input information relevant to the previous decoder state. $\lambda_D$ denotes the set of decoder parameters.

The context vector 220 is obtained by a hierarchical attention mechanism that first aggregates frame-level hidden vectors for each input sequence into modality-wise context vector $c_{k,i}$, and then fuses the context vectors $c_{1,i}, \ldots, c_{K,i}$ into a single context vector $g_i$. The attention mechanism is realized by using attention weights to the hidden activation vectors throughout the input sequence. These weights enable the network to emphasize features from those time steps that are most important for predicting the next output word.

Let $\alpha_{k,i,t}$ be an attention weight between the ith output word and the tth input feature vector from the kth modality. For the ith output, the vector representing the relevant context of the input sequence is obtained as a weighted sum of hidden unit activation vectors:

$$c_{k,i} = \sum_{t=1}^{L_k} \alpha_{k,i,t} h_{k,t}, \quad (6)$$

where $h_{k,t}$ is the tth output vector of the kth encoder. The attention weights are computed as:

$$\alpha_{k,i,t} = \frac{\exp(e_{k,i,t})}{\sum_{\tau=1}^{L} \exp(e_{k,i,\tau})} \quad (7)$$

and $$e_{k,i,t} = w_{Ak}^{\vec{a}} \tanh(W_{Ak} s_{i-1} + V_{Ak} h_{k,t} + b_{A,k}), \quad (8)$$

where $W_{Ak}$ and $V_{Ak}$ are matrices, $w_{Ak}$ and $b_{Ak}$ are vectors, and $e_{k,i,t}$ is a scalar.

The model also utilizes a multimodal attention mechanism. To fuse multimodal information, a method that extends the attention mechanism from temporal attention (attention over time) to attention over modalities. The following equation shows an approach to perform the attention-based feature fusion:

$$g_i = \tanh\left(\sum_{k=1}^{K} \beta_{k,i} d_{k,i}\right), \quad (9)$$

where $$d_{k,i} = W_{ck}^{(\lambda_D)} c_{k,i} + b_{ck}^{(\lambda_D)}, \quad (10)$$

and $c_{k,i}$ is a context vector obtained using the kth input modality. A similar mechanism for temporal attention is applied to obtain the multimodal attention weights $\beta_{k,i}$. 0

$$\beta_{k,i} = \frac{\exp(v_{k,i})}{\sum_{\kappa=1}^{K} \exp(v_{\kappa,i})}, -6pt \quad (11)$$

where $$v_{k,i} = w_B^{\tilde{u}} \tanh(W_B s_{i-1} + V_{Bk} c_{k,i} + b_{Bk}). \quad (12)$$

Here the multimodal attention weights are determined by decoder state $s_i$ and the context vector of each modality $C_{k,i}$ as well as temporal attention weights in each modality. $W_B$ and $V_{Bk}$ are matrices, $w_B$ and $b_{Bk}$ are vectors, and $v_{k,n}$ is a scalar. These weights can change according to the decoder state and the context vector from each encoder. This enables the decoder network to attend to a different set of features and/or modalities when predicting each subsequent word in the description.

Student-Teacher Learning (Please Explain Using The Tag Numbers in FIG. 2B)

FIG. 2B is a block diagram illustrating a student-teacher learning of AVSD system according to some embodiments of the present invention. The AVSD system includes a student network 210 and a teacher network 250 The figure depicts the concept of student-teacher learning for the AVSD system. The goal of this step is to obtain a student model 210 that does not make use of video description text, which is trained to mimic a teacher model 250 that has already been trained using video description text. Accordingly, the student model 210 can be used to generate system responses without relying on description text, while hopefully achieving similar performance to the teacher model 250.

Following the best system in DSTC7-AVSD track, we insert the description text 209 at the beginning of each question. This means that the same description is always fed to the encoder together with a new question, at every turn of the dialogue about the target video clip. The student network 210 is trained to reduce the cross entropy loss, by using the output of the teacher network 250 as a soft target to make the output distribution of the student model 210 closer to that of the teacher model 250.

In this disclosure, we investigate three loss functions for student-teacher learning 290. The first one is a cross entropy loss with soft targets:

$$L_{ST}(X, Y) = -\sum_{i=1}^{|Y|} \sum_{y \in V} \hat{P}(y | \hat{s}_{i-1}, \hat{g}_i) \log P(y | s_{i-1}, g_i), \quad (13)$$

where $\hat{P}(y|\hat{s}_{i-1},\hat{g}_i)$ denotes the probability distribution for the ith word obtained by the teacher network 250, and $\hat{s}_{i-1}$ and $\hat{g}_i$ are state and context vectors 270 generated by the teacher network 250 for training sample (X,Y). Here, $P(y|s_{i-1},g_i)$ is the posterior distribution from the current student network 210 (which is being trained), which is predicted without the description text 209.

The second loss function further incorporates the context vector similarity as $$L'_{ST}(X,Y) = L_{ST}(X,Y) + \lambda_c L_{MSE}(X,Y) \quad (14)$$

where $L_{MSE}(X,Y) = \sum_{i=1}^{|Y|} MSE(g_i, \hat{g}_i)$, where $MSE(\cdot,\cdot)$ denotes the mean square error between two context vectors 230 and 270, and $\lambda_c$ denotes a scaling factor. We aim here to compensate for missing input features at the context vector level, which hopefully exploits other modalities more actively.

The last loss function we consider is joint student-teacher learning. The parameters of the teacher network 250 are typically kept fixed throughout the training phase. However, in the joint training approach, we update not only the student network 210 but also the teacher network 250. The loss function is computed as $$L_{JST}(X,Y) = L_{ST}^{(S)}(X,Y) + L_{CE}^{(T)}(X,Y) + \lambda_c L_{MSE}^{(ST)}(X,Y), -6pt \quad (15)$$

where $L_{CE}^{(T)}$ is the standard cross entropy for hard target Y, which is used only for the teacher network 250 in the backpropagation process. Likewise, $L_{ST}^{(S)}$ is used only for the student network 210, while $L_{MSE}^{(ST)}$ is used for the both networks.

FIG. 3 is a block diagram illustrating some embodiments of the present disclosure based on generating context vectors 333 obtained from the first multimodal encoder-decoder for automatic video descriptions 350, wherein the automatic video description sentences 391 are input to the second multimodal encoder-decoder for dialog response generation 300 as text features 333 input instead of the manual video description sentences 201 relevant to the auto-video datasets.

In addition, the context vector output 380 from the encoder of the first multimodal encoder-decoder for video description 350 may be embedded in the context vector of the dialog response sentences 335 input to the decoder of the second multimodal encoder-decoder for dialog response generation 300.

FIG. 4 shows the statistics of video scene-aware dialogue dataset, according to some embodiments of the present invention. The AVSD data set is a collection of text-based conversations about short videos. The video clips were originally from Charades data set, which is an untrimmed and multi-action dataset, containing 11,848 videos split into 7,985 for training, 1,863 for validation, and 2,000 for inferencing. It has 157 action categories, with several fine-grained actions. Further, this dataset also provides 27,847 textual descriptions for the videos; each video is described using 1-3 sentences. For each video in the Charades dataset, the AVSD dataset contains a text dialogue between two people discussing the video.

AVSD System

FIG. 2A is a diagram illustrating the model 200, which indicates how the AVSD system is trained according to an embodiment of the present invention. The question encoder had a word embedding layer (200 dim.) and two BLSTM layers (256 dim. for each direction). Audio-visual features consisting of I3D-rgb (2048 dim.), I3D-flow (2048 dim.), and VGGish (128 dim.) were extracted from video frames using pre-trained deep CNNs. Those feature sequences were then fed to the multimodal encoders with single projection layers, which converted them to 512, 512, and 64 dimensional vectors, respectively. The history encoder had a word embedding layer (200 dim.) and two LSTM layers for QA-pair embedding (256 dim.) and a 1-layer BLSTM for embedding the history (256 dim. for each direction). We used ADAM optimizer for training, where the learning rate was halved if the validation perplexity did not decrease after each epoch, and continued training up to 20 epochs. The vocabulary size was 3910, where we kept only the words that appeared at least four times in the training set.

FIG. 5A shows evaluation results on the AVSD trial inference set with single references, according to embodiments of the present invention. The quality of system responses was measured using objective scores such as BLEU, METEOR, ROUGE-L, and CIDEr, which were based on the degree of word overlapping with references. The baseline system provided by DSTC7-AVSD track organizers, which was a simple LSTM-based encoder decoder utilizing the same audio-visual features as ours, was also evaluated. We also show the results of the AVSD best system. That system had a similar architecture to ours, but it had only two encoders: one for questions, and the other for video features obtained by a 3D ResNet. That network was additionally pretrained using the How2 data set, while our model was trained with only the AVSD data set.

Although our system outperformed the best AVSD system when using manual video description sentences for both training and inferencing ("man. man." in the second column), the performance significantly degraded when the description was not fed to the network in the inference phase ("man. —"). When we provided automatic description instead of manual one ("man. auto"), where we used a video description model trained with the same AVSD data set, the improvement was limited. The model trained without descriptions ("— —") was slightly better than other conditions.

Next, we applied student-teacher learning with loss $L_{ST}$. The trained model provided significant gains in all the objective metrics (e.g., BLEU4: 0.105→0.113, METEOR: 0.135→0.143), which were closer to those obtained using the manual video description sentences (e.g., BLEU4: 0.117, METEOR: 0.150). We also applied loss function $L'_{ST}$ that considered context vector similarity, but the response quality was almost the same as $L_{ST}$. Finally, we conducted joint student-teacher learning with $L_{JST}$, and obtained further improvements in most objective measures (e.g., BLEU4: 0.113→0.115, METEOR: 0.143→0.144).

FIG. 5B shows evaluation results on the AVSD official inference set with six references for each response. Similar to FIG. 6A, the system according to the present invention outperformed the other ones including the best system of DSTC7. The student-teacher framework also provided significant gains for the official inference set.

As discussed above, some embodiments according to the present invention can provide a computer-implemented method how to compensate, at inference time, for the lack of video description features that were available during training. The present invention can provide a student-teacher learning framework for Audio-Visual Scene-aware Dialog (AVSD). It is found that AVSD system according to the present invention can achieve better performance than previous methods, which is competitive to systems trained with manual video description sentences, and further outperformed the best DSTC7-AVSD system. The trained model can answer questions about video context by fusing audio, visual, and text information about the video, and generates high quality responses without relying on manual video description sentences. Further, another embodiment of the present invention can provide a joint student-teacher learning approach, which can achieve further gains in most objective metrics.

In some embodiments of the present disclosure, when the multi-modal fusion model described above is installed in a computer system, video script can be effectively generated with less computing power, thus the use of the multi-modal fusion model method or system can reduce central processing unit usage and power consumption.

Further, embodiments according to the present disclosure provide effective method for performing the multimodal fusion model, thus, the use of a method and system using the multimodal fusion model can reduce central processing unit (CPU) usage, power consumption and/or network band width usage.

The above-described embodiments of the present disclosure can be implemented in any of numerous ways. For example, the embodiments may be implemented using hardware, software or a combination thereof. When implemented in software, the software code can be executed on any suitable processor or collection of processors, whether provided in a single computer or distributed among multiple computers. Such processors may be implemented as integrated circuits, with one or more processors in an integrated circuit component. Though, a processor may be implemented using circuitry in any suitable format.

Also, the various methods or processes outlined herein may be coded as software that is executable on one or more processors that employ any one of a variety of operating systems or platforms. Additionally, such software may be written using any of a number of suitable programming languages and/or programming or scripting tools, and also may be compiled as executable machine language code or intermediate code that is executed on a framework or virtual machine. Typically, the functionality of the program modules may be combined or distributed as desired in various embodiments.

Further, the embodiments of the present disclosure may be embodied as a method, of which an example has been provided. The acts performed as part of the method may be ordered in any suitable way. Accordingly, embodiments may be constructed in which acts are performed in an order different than illustrated, which may include performing some acts concurrently, even though shown as sequential acts in illustrative embodiments. Further, use of ordinal terms such as first, second, in the claims to modify a claim element does not by itself connote any priority, precedence, or order of one claim element over another or the temporal order in which acts of a method are performed, but are used merely as labels to distinguish one claim element having a certain name from another element having a same name (but for use of the ordinal term) to distinguish the claim elements.

Although the present disclosure has been described with reference to certain preferred embodiments, it is to be understood that various other adaptations and modifications can be made within the spirit and scope of the present disclosure. Therefore, it is the aspect of the append claims to cover all such variations and modifications as come within the true spirit and scope of the present disclosure.

We claim:

1. A computer-implemented method for training a dialogue response generation system comprising steps of:
arranging a first multimodal encoder-decoder having a first input and a first output, wherein the first multimodal encoder-decoder has been pretrained by training audio-video datasets with training descriptions;

arranging a second multimodal encoder-decoder having a second input and a second output;

providing first audio-visual datasets with first corresponding description sentences to the first input of the first multimodal encoder-decoder, wherein the first multimodal encoder-decoder generates first output values based on the first audio-visual datasets with the first corresponding description sentences;

providing the first audio-visual datasets excluding the first corresponding description sentences to the second multimodal encoder-decoder, wherein the second multimodal encoder-decoder generates second output values based on the first audio-visual datasets without the first corresponding description sentences, wherein an optimizer module updates second network parameters of the second multimodal encoder-decoder until errors between the first output values and the second output values are reduced into a predetermined range, wherein the errors are computed based on a loss function.

2. The computer-implemented method of claim 1, wherein the loss function is a cross entropy loss function.

3. The computer-implemented method of claim 2, the loss function incorporates mean square error between context vectors of the first and the second multimodal encoder-decoders.

4. The computer-implemented method of claim 1, wherein first parameters of the first multimodal encoder-decoder are not updated.

5. The computer-implemented method of claim 1, wherein the optimizer module updates first parameters of the first multimodal encoder-decoder based on a cross entropy loss function.

6. The computer-implemented method of claim 1, wherein the optimizer module updates the second network parameters of the second multimodal encoder-decoder using a back propagation method.

7. The computer-implemented method of claim 1, further comprises providing second audio-visual datasets to the first input of the first multimodal encoder-decoder to generate third audio-visual datasets, wherein the generated third audio-visual datasets are further provided to the second multimodal encoder-decoder to further update the second network parameters.

8. A system for training a dialogue response generation system, comprising:
a memory and one or more storage devices storing instructions of a computer-implemented method of claim 1;
one or more processors in connection with the memory and one or more storage devices that are operable, when executed by the one or more processors, to cause the one or more processors to perform operations comprising steps of:
arranging a first multimodal encoder-decoder having a first input and a first output, wherein the first multimodal encoder-decoder has been pretrained by training audio-video datasets with training descriptions;
arranging a second multimodal encoder-decoder having a second input and a second output;
providing first audio-visual datasets with first corresponding description sentences to the first input of the first multimodal encoder-decoder, wherein the first multimodal encoder-decoder generates first output values based on the first audio-visual datasets with the first corresponding description sentences;
providing the first audio-visual datasets excluding the first corresponding description sentences to the second multimodal encoder-decoder, wherein the second multimodal encoder-decoder generates second output values based on the first audio-visual datasets without the first corresponding description sentences, wherein an optimizer module updates second network parameters of the second multimodal encoder-decoder until errors between the first output values and the second output values are reduced into a predetermined range, wherein the errors are computed based on a loss function.

9. The system of claim 8, wherein the loss function is a cross entropy loss function.

10. The system of claim 9, the loss function incorporates mean square error between context vectors of the first and the second multimodal encoder-decoders.

11. The system of claim 8, wherein first parameters of the first multimodal encoder-decoder are not updated.

12. The system of claim 8, wherein the optimizer module updates first parameters of the first multimodal encoder-decoder based on a cross entropy loss function.

13. The system of claim 8, wherein the optimizer module updates the second network parameters of the second multimodal encoder-decoder using a back propagation method.

14. The system of claim 8, further comprises providing second audio-visual datasets to the first input of the first multimodal encoder-decoder to generate third audio-visual datasets, wherein the generated third audio-visual datasets are further provided to the second multimodal encoder-decoder to further update the second network parameters.

15. A dialogue response generation system comprising:
a memory and one or more storage devices storing instructions of multimodal encoder-decoders, wherein the multimodal encoder-decoders have been trained by a computer-implemented method comprising steps of:
arranging a first multimodal encoder-decoder having a first input and a first output, wherein the first multimodal encoder-decoder has been pretrained by training audio-video datasets with training descriptions;
arranging a second multimodal encoder-decoder having a second input and a second output;
providing first audio-visual datasets with first corresponding description sentences to the first input of the first multimodal encoder-decoder, wherein the first multimodal encoder-decoder generates first output values based on the first audio-visual datasets with the first corresponding description sentences; and
providing the first audio-visual datasets excluding the first corresponding description sentences to the second multimodal encoder-decoder, wherein the second multimodal encoder-decoder generates second output values based on the first audio-visual datasets without the first corresponding description sentences, wherein an optimizer module updates second network parameters of the second multimodal encoder-decoder until errors between the first output values and the second output values are reduced into a predetermined range, wherein the errors are computed based on a loss function;
one or more processors in connection with the memory and one or more storage devices that are operable, when executed by the one or more processors, to cause the one or more processors to perform operations comprising steps of:
receiving first and second input vectors according to first and second sequential intervals;

extracting first and second feature vectors using first and second feature extractors, respectively, from the first and second input;

estimating a first set of weights and a second set of weights, respectively, from the first and second feature vectors and a prestep context vector of a sequence generator;

calculating a first context vector from the first set of weights and the first feature vectors, and calculating a second context vector from the second set of weights and the second feature vectors;

transforming the first context vector into a first modal context vector having a predetermined dimension and transforming the second context vector into a second modal context vector having the predetermined dimension;

estimating a set of modal attention weights from the pre-step context vector and the first and second context vectors or the first and second modal context vectors;

generating a weighted context vector having the predetermined dimension from the set of modal attention weights and the first and second modal context vectors; and generating a predicted word using the sequence generator for generating the word sequence from the weighted context vector.

16. The dialogue response generation system of claim 15, wherein the loss function is a cross entropy loss function.

17. The dialogue response generation system of claim 16, the loss function incorporates mean square error between context vectors of the first and the second multimodal encoder-decoders.

18. The dialogue response generation system of claim 15, wherein first parameters of the first multimodal encoder-decoder are not updated.

19. The dialogue response generation system of claim 15, wherein the optimizer module updates first parameters of the first multimodal encoder-decoder based on a cross entropy loss function.

20. The dialogue response generation system of claim 15, wherein the optimizer module updates the second network parameters of the second multimodal encoder-decoder using a back propagation method.

* * * * *